3,644,411
BIOSTATIC USE OF SUBSTITUTED PHENYL-SULFONYL-HYDROXAMINES

Don R. Baker, 3136 Estates Ave., Pinole, Calif. 94564; Llewellyn W. Fancher, 1662 Foothill Park Circle, Lafayette, Calif. 94549; and Malcolm B. McClellan, 1112 Arlington Lane, San Jose, Calif. 95129
No Drawing. Continuation of application Ser. No. 823,217, Feb. 14, 1969, which is a division of application Ser. No. 568,372, July 28, 1966, now Patent No. 3,458,570. This application July 13, 1970, Ser. No. 56,195
Int. Cl. A01n 9/16, 9/20, 9/30
U.S. Cl. 424—286            12 Claims

ABSTRACT OF THE DISCLOSURE

This invention relates to the use of certain N-substituted phenylsulfonylhydroxyamines in bacteriostatic and fungistatic composition.

---

This application is a continuation of application Ser. No. 823,217, filed Feb. 14, 1969, now abandoned, which in turn is a division of Ser. No. 568,372, filed July 28, 1966, now Pat. No. 3,458,570.

The compounds comprising the instant class correspond to the general formula

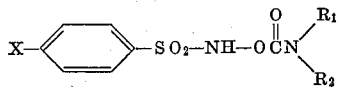

wherein $R_1$ and $R_2$ are selected from the group consisting of hydrogen and lower alkyl containing up to 4 carbon atoms, and X is selected from the group consisting of hydrogen and chlorine.

The compounds herein contemplated can be prepared by several methods. Among these general methods applicable in preparing the compounds is the condensation reaction between the appropriate N-hydroxybenzene sulfonamide and a lower alkyl isocyanate or between the appropiate N-hydroxybenzene sulfonamide and a N,N-dialkyl carbamayl chloride. The condensation reactions are generally carried out in the presence of a catalyst, such as triethylamine, dibutyl tin dilaurate and the like, to facilitate the completion of the reaction. The reactions proceed readily in the liquid phase. The employment of an inert organic solvent is also useful, aiding in the processing as well as agitation of the reactants. Temperatures that permit operation in the liquid phase and which allow controllable reaction, primarily between 0° C. and reflux temperature of the solvent, if any is used, are employed. Preferably after the reactants have been mixed at a low temperature the reaction is allowed to proceed at from 25° C. to reflux temperature.

It has been found that the agents as defined supra are effective bacteriostatic and fungistatic compositions. Whereas microbiological growths on various substances cause deterioration by the presence of the infestation, the application of an agent to retard this adverse growth is desired. Such substances liable to fungus include cloth, leather, paint, soaps, paper, wood, plastic, oil, and the like. It is contemplated herein that the microbiocidal compositions of the present invention may be effectively incorporated or applied to any of the substances susceptible to microbiological growths.

For maximum effectiveness the active ingredients of the present invention are admixed in microbiostatically effective amounts with an inert adjuvant. In order to provide formulations particularly adapted for ready and efficient application to the materials to be treated, such formulations comprise those of both the liquid and solid types as well as the "aerosol" type formulations. Application may be directly to the substance to be protected from fungus and bacterial growth. In the pure state the active ingredient may be too effective or too potent in some applications to have practical utility. For most effective protection it is preferred to apply the materials in intimate contact but thoroughly dispersed on or nearly in the surface to be protected. Therefore, the active ingredients have incorporated therewith a relatively inert agent or adjuvant as a dispersing medium, utilizing methods well-known to those skilled in the art.

Suitable formulations of the compounds of this invention comprise the above defined active ingredients and a suitable material as an adjuvant therefor. Fungistat and bacteriostat compositions are advantageously formulated by first preparing a solution thereof in an organic solvent and then adding the resulting solution to water or other carrier. If necessary an emulsifying agent may be employed. The compositions may also be incorporated into solid carriers such as clay, talc, pumice, soap, and the like. They may also be dissolved in liquefied gases such as fluorochloroethanes or methyl chloride and applied from aerosol bombs containing the solution. It should be noted that suitable formulations may also include adhesive agents, indicators, and other microbiocidal ingredients. Other ingredients may be supplementary insecticides, fungicides, bacteriocides, nematocides or selective herbicides.

Since the amount of active agent of the present invention which is employed will vary with the microbiocidal effect sought, the utility of the treated material, the type and dimensions of the material treated, it is evident that no rigid limits can be set forth on the quantity required. Determination of the optimum effective concentration for a specific performance is readily conducted by routine procedures, as will be apparent to those skilled in the art.

The compounds of the present invention may be prepared in accordance with the following examples.

EXAMPLE 1

Preparation of N-(N'-methylcarbamoyl)O-phenyl-sulfonyl-hydroxylamine

N-hydroxybenzene sulfonamide 12.1 g. (0.08 M) was added to a mixture of 11.4 g. (0.2 M) of methyliso-cyanate in 50 ml. of chloroform and four drops of triethylamine and three drops of dibutyl tin dilaurate. The mixture was refluxed on a steambath for two hours, then diluted with 150 ml. of warm chloroform. The mixture was washed once with warm dilute aqueous sodium chloride solution and cooled. The solid which separated was filtered off, washed with 30°–60° petroleum ether and air dried. There was obtained 11.0 g. (68 percent of theory) of the title compound, M.P. 165° C. (without decomposition). Infrared analysis supported the expected structure.

EXAMPLE 2

Preparation of N-(N',N'-dimethylcarbamoyl) O-phenylsulfonyl-hydroxylamine

N-hydroxybenzene sulfonamide 138.4 g. (0.8 M) was slurried in 500 ml. of chloroform and cooled to 5° C. Triethylamine (201 g., 1.0 M) 138 ml. was added with stirring and cooling at such a rate that the temperature did not exceed 10° C. When all of the solid material was in solution (107.5 g., 1.0 M), 95 ml. of dimethylcarbamyl chloride was added with stirring and cooling over a 15–20 minute period, the temperature was held at 5–6° C. Stirring was continued at 5–6° C. for 5 minutes then the temperature raised rapidly by means of a warm water bath to 25° C. and the mixture stirred for an additional hour at 25–30° C. Stirring was discontinued, the flask immersed in a slurry of crushed ice and water and allowed to stand overnight. The product was washed successively with dilute aqueous sodium chloride, dilute cold hydrochloric acid and dilute aqueous sodium chloride. After drying over anhydrous $MgSO_4$ and filtering, the chloroform was evaporated and the solid residue crystallized from carbon tetrachloride. There was obtained 131.6 g. (67% yield) of the product (M.P. 81–90° C.). The infrared analysis data was consistent with the expected structure of the title compound.

*Analysis.*—Calculated (percent): carbon, 44.3; hydrogen, 4.95; sulfur, 13.1. Found (percent): carbon, 44.9; hydrogen, 5.27; sulfur, 12.6.

The following is a table of the compounds prepared in accordance with the aforedescribed procedures. Compound numbers have been assigned to each compound and are then used for identification throughout the balance of the application.

TABLE I $$X-\underset{}{\bigcirc}-SO_2-NHO\overset{O}{\underset{}{C}}-N\underset{R_2}{\overset{R_1}{\diagdown}}$$

| Compound Number | X | $R_1$ | $R_2$ | $n_D^{30}$ or M.P. (° C.) |
|---|---|---|---|---|
| 1 [1] | H | H | $CH_3$ | [2] 165 |
| 2 [3] | H | $CH_3$ | $CH_3$ | 81–90 |
| 3 | H | $C_2H_5$ | $C_2H_5$ | 1.5160 |
| 4 | H | H | $C_2H_5$ | 128–131 |
| 5 | Cl | $CH_3$ | $CH_3$ | 105–110 |

[1] Number 1 prepared in Example 1.
[2] Decomposed.
[3] Number 2 prepared in Example 2.

As previously mentioned, the herein described novel compositions produced in the above-described manner are microbiostatic compounds which are useful and valuable in controlling fungi and bacteria. The compounds of this invention were tested as microbiocides in the following manner.

*In vitro vial tests.*—The compounds were tested to determine the microbiostatic efficacy when in contact with growing fungi or bacteria in an artificial medium. For each candidate compound four 1-ounce vials were partially filled; two with malt broth and two with nutrient broth. The compound to be tested was placed in the vials at the desired concentration (expressed in parts per million). The vials were inoculated with water suspensions of spores of the desired fungi, *Aspergillus niger* and *Penicillium sp.* and cells of the bacteria, *Escherichia coli* and *Staphylococcus aureus* (one organism per vial). The vials were then sealed and held for one week, after which time the growth of the organisms was observed and noted. The tests were repeated using lower concentrations of the candidate compounds to determine the lowest concentration that can be used and still offer some control of the growth of the organism. Table II shows the results of the in vitro tests:

TABLE II

[In vitro test lowest effective concentration (p.p.m.)]

| | Aspergillus niger | Penicillium sp. | Escherichio coli | Staphylococcus aureus |
|---|---|---|---|---|
| Compound number: | | | | |
| 1 | 50 | >50 | 10 | >50 |
| 2 | 50 | >50 | 5 | 50 |
| 3 | (50) | (50) | >50 | >50 |
| 4 | 50 | >50 | >50 | >50 |
| 5 | (25) | 25 | 50 | 50 |

NOTE.—( ) indicates partial control at this concentration.

Compound No. 2 was further tested in the following manner. A sample of compound No. 2 (39.2 g.) was diluted with soap chips to a 1 percent concentration. The mixture was pressed into small soap plugs 1 cm. in diameter and approximately 5 mm. thick. These plugs were placed on nutrient agar plates inoculated with *Escherichia coli* and *Staphylococcus aureus* cells. The plates were incubated at 37° C. for 17 hours. The radius of the zone of inhibition around the soap plug was measured. The plate inoculated with *Staphylococcus aureus* had a zone of inhibition of 6 to 10 mm. The plate inoculated with *Escherichia coli* cells had a zone of inhibition of 5 to 9 mm.

In a further test, a 10 percent soap in water mixture was prepared from one of the above prepared soap plugs. To this was added two 1 cm. square sections of untanned calves hide from which the hair had been shaved off. The mixture was stirred with a stirring rod for 1 minute and the samples of hide removed and washed with 4–100 ml. portions of distilled water. These disks were placed on nutrient agar streaked with *Staphylococcus aureus* organisms and incubated at 37° C. for 17 hours. The radius of the zone of inhibition around the hide was 1 to 2 mm.

Compound No. 2 was also tested in its effectiveness against *Pityrosporum ovale* organisms in in vitro tests. The compound was dissolved in acetone to give a 0.1 percent solution. From this solution aliquots were added to 20 ml. of melted Emmons agar to give a concentration of 50 p.p.m., 10 p.p.m., 5 p.p.m. and 1 p.p.m. The agar was allowed to cool and harden and then inoculated with 1 ml. of corn oil containing *Pityrosporum ovale* organisms. The plates were incubated at 30° C. for 3 days. After this time 100% control of the organism was shown at a level of 50 p.p.m.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of controlling the growth of bacteria and fungi comprising applying thereto a bacteria and fungi controlling amount of the compound of the formula

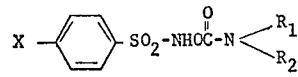

wherein $R_1$ and $R_2$ are selected from the group consisting of hydrogen and lower alkyl containing up to 4 carbon atoms, and X is selected from the group consisting of hydrogen and chlorine.

2. The method according to claim 1, wherein $R_1$ is hydrogen, $R_2$ is methyl and X is hydrogen.

3. The method according to claim 1, wherein $R_1$ is methyl, $R_2$ is methyl and X is hydrogen.

4. The method according to claim 1, wherein $R_1$ is ethyl, $R_2$ is ethyl and X is hydrogen.

5. The method according to claim 1, wherein $R_1$ is hydrogen, $R_2$ is ethyl and X is halogen.

6. The method according to claim 1, wherein $R_1$ is methyl, $R_2$ is methyl and X is chlorine.

7. a bacteriocidal and fungicidal composition comprising an inert microbiocidal adjuvant and a bacteriocidally and fungicidally effective amount of a compound of the formula

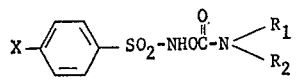

wherein $R_1$ and $R_2$ are selected from the group consisting of hydrogen and lower alkyl containing up to 4 carbon atoms, and X is selected from the group consisting of hydrogen and chlorine.

8. The composition according to claim 7, wherein $R_1$ is hydrogen, $R_2$ is methyl and X is hydrogen.

9. The composition according to claim 7, wherein $R_1$ is methyl, $R_2$ is methyl and X is hydrogen.

10. The composition according to claim 7, wherein $R_1$ is ethyl, $R_2$ is ethyl and X is hydrogen.

11. The composition according to claim 7, wherein $R_1$ is hydrogen, $R_2$ is ethyl and X is hydrogen.

12. The composition according to claim 7, wherein $R_1$ is methyl, $R_2$ is methyl and X is chlorine.

References Cited

Chemical Abstracts, 52:14667b (1956).

ALBERT T. MEYERS, Primary Examiner

L. SCHENKMAN, Assistant Examiner

UNITED STATES PATENT OFFICE
CERTIFICATE OF CORRECTION

PO-1050
(5/69)

Patent No. 3,644,411    Dated February 22, 1972

Inventor(s) Don R. Baker et al.

It is certified that error appears in the above-identified patent and that said Letters Patent are hereby corrected as shown below:

Column 1, in the patent heading, line 7, after the numerals "95129", the phrase ---assignors to Stauffer Chemical Company, New York, N.Y.--- should be inserted.

Column 1, line 20, the word "composition", should read ---compositions---.

Column 1, line 44, the word "carbamayl", should read ---carbamyl---.

Signed and sealed this 3rd day of October 1972.

(SEAL)
Attest:

EDWARD M. FLETCHER, JR.
Attesting Officer

ROBERT GOTTSCHALK
Commissioner of Patents